United States Patent
Carpentier et al.

(10) Patent No.: US 10,759,460 B2
(45) Date of Patent: Sep. 1, 2020

(54) FASTENING DEVICE FOR A SECURITY MODULE ON A VEHICLE STEERING WHEEL

(71) Applicant: AUTOLIV DEVELOPMENT AB, Vargarda (SE)

(72) Inventors: Franck Carpentier, Saumont la Poterie (FR); Cyrille Lanvin, Saint-Aubin-en-Bray (FR); Thierry Matrat, Vouille (FR); Fabrice Galmiche, Poitiers (FR); Sebastien Cassin, Jaunay Clan (FR); Sylvain Langlet, Goincourt (FR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/971,070

(22) Filed: May 4, 2018

(65) Prior Publication Data
US 2019/0337551 A1 Nov. 7, 2019

(51) Int. Cl.
*B62D 1/04* (2006.01)
*B60R 21/2165* (2011.01)
*B60R 21/203* (2006.01)

(52) U.S. Cl.
CPC .......... *B62D 1/04* (2013.01); *B60R 21/21656* (2013.01); *B60R 21/2037* (2013.01)

(58) Field of Classification Search
CPC .. B62D 1/04; B60R 21/21656; B60R 21/2037
See application file for complete search history.

(56) References Cited

U.S. PATENT DOCUMENTS

| | | | | |
|---|---|---|---|---|
| 5,380,037 | A | * | 1/1995 | Worrell ................. B60Q 5/003 200/61.55 |
| 6,082,758 | A | * | 7/2000 | Schenck ................ B60Q 5/003 200/305 |
| 6,092,832 | A | * | 7/2000 | Worrell ............... B60R 21/2035 280/728.2 |
| 10,266,142 | B2 | | 4/2019 | Li et al. |
| 2002/0043786 | A1 | | 4/2002 | Schutz |
| 2016/0347345 | A1 | * | 12/2016 | Obayashi ............ B60R 21/2037 |
| 2019/0337551 | A1 | * | 11/2019 | Carpentier ........ B60R 21/21656 |

* cited by examiner

*Primary Examiner* — Vicky A Johnson
(74) *Attorney, Agent, or Firm* — Stephen T. Olson; Harness, Dickey & Pierce, P.L.C.

(57) ABSTRACT

A device for fastening a safety module on a steering wheel frame includes at least one resilient ring, at least one hook and at least one valve gridge. The at least one hook includes a first surface forming a guide track ending on an inflection point, and a second surface separated from the first surface by the inflection point. The at least one valve bridge has with a third surface across from the second surface of the hook. The resilient ring locks the module fixed on the frame by bearing on the second surface of the hook and on the third surface of the valve bridge. The third surface of the valve bridge includes at least one recess arranged across from the inflection point.

13 Claims, 2 Drawing Sheets

FASTENING DEVICE FOR A SECURITY MODULE ON A VEHICLE STEERING WHEEL

CROSS-REFERENCE TO RELATED APPLICATIONS

This application claims priority to French Patent Application No. FR 1754005, filed May 5, 2017. The entire disclosure of the above application is incorporated herein by reference.

TECHNICAL FIELD

The present invention generally relates to a fastening device arranged to fasten and lock a safety module on a vehicle steering wheel mounted on a motor vehicle.

PRIOR ART

Devices are known in the prior art for fastening and/or locking a safety module on a vehicle steering wheel, like that disclosed in document US2002043786 and which comprises a resilient ring that bears on a locking surface of the module and an opposite locking surface of the steering wheel to fasten and lock the module on the steering wheel (its frame in general). In return, this system in particular has the drawback of not having locking of the ring in its final position; indeed, the locking surfaces are planar and the ring can free itself from the locking surfaces. However, the addition of a system for keeping the ring in its final position requires passing the ring through an inflection point, which may create difficulties for mounting the safety module on the steering wheel to pass this inflection point. Indeed, the module is constantly pushed back by resilient means, such as elastomeric studs, against the resilient ring to prevent vibrational noises, and passing the inflection point requires compressing these elastomeric means. Based on the dimensions or ambient temperatures, the compression forces may vary within large proportions.

Furthermore, FIGS. 1 to 3 show an operation for mounting a safety module equipped with a fastening device on the steering wheel according to the prior art, with the passage of a resilient ring 10 above an inflection point 22, which requires major assembly efforts to be applied by an operator (force F2 shown in FIG. 2). FIGS. 1 to 3 are discussed in more detail in the preamble of the section "detailed description of one embodiment," after the brief description of the drawings.

BRIEF DESCRIPTION OF THE INVENTION

One aim of the present invention is to resolve the aforementioned drawbacks of the prior art, and in particular, first of all, to propose a device for fastening a safety module on a vehicle steering wheel with locking by a resilient ring, with guaranteed maintenance of the ring in the final locking position, while providing easier assembly.

To that end, a first aspect of the invention relates to a device for fastening a safety module on a steering wheel frame, comprising:
at least one resilient ring, movable between an initial position and a final position,
at least one hook, with:
a first surface forming a guide track ending on an inflection point, to cause the resilient ring to go, during a docking movement of the module on the frame, from the initial position to a relaxed position, and
a second surface separated from the first surface by the inflection point and arranged to receive the resilient ring going from the relaxed position to the final position,
at least one valve bridge, with a third surface across from the second surface, wherein the resilient ring in the final position locks the module fixed on the frame by bearing on the second surface and on the third surface, characterized in that the third surface comprises at least one recess arranged across from the inflection point.

The device comprises an inflection point, i.e., it forms a passage point with a maximum necessary displacement of the module to cause the resilient ring to pass during assembly.

Furthermore, the valve bridge of the above device comprises a recess, i.e., an indentation, a cavity, a setback relative to the third surface, and this recess is arranged across from the inflection point, i.e., during the assembly, the resilient ring, when it passes by the inflection point, is located between the inflection point and the recess, to next relax toward its final position (between the second surface and the rest of the third surface).

Consequently, the recess makes it possible to pass the inflection point without having to compress the anti-vibration devices much more, which continuously push the module back against the resilient ring. In any case, the antivibration devices are compressed much less, for the assembly of the module, when the recess is present than if there is no recess. In other words, the ring more easily (with less force to be applied) finds, during the docking movement of the module, its conditions for passing toward the final position between the valve bridge and the inflection point. The assembly is easier and/or more repeatable, since the forces are smaller and/or vary less based on geometric dispersions and/or assembly temperatures.

In other words, when the safety module is assembled, the ring is in constant contact with the hook while going from its initial position to the relaxed position while being tensed by the hook. Upon passing the inflection point, the ring remains in contact with the hook (the inflection point), but also the recess of the third surface, and once it has passed the inflection point, the ring comes into contact with the second surface, the rest of the recess, and will lastly become wedged in the final position, in which it is simultaneously in contact with the second surface and the part of the third surface located beyond the recess. The third surface therefore comprises a pushed-in part (with which the ring being assembled is in contact), and a non-pushed-in part (with which the ring is in contact once assembled, in the final position).

Advantageously, the second surface is tilted relative to the displacement direction of the module during the assembly, which forms an obstacle for the resilient ring if it leaves its final position (since it would then be necessary to compress the antivibration devices again). The position of the resilient ring is therefore secured in its final position. Typically, the steering wheel is assembled on a steering column that has a rotation axis, and the assembly direction of the safety module is parallel to the rotation axis, and the second surface is oriented by an angle strictly greater than 90° relative to the rotation axis and/or the assembly direction. In particular, the slope of the second surface can be comprised in a range from 1° to 15°, i.e., the angle between the second surface and the rotation axis of the steering wheel or the assembly direction is comprised in a range of values from 91° to 105°.

Advantageously, the fastening device comprises at least one resilient member arranged between the frame and the safety module, to exert a residual force in a direction opposite a docking direction of the module on the frame once the module is fastened on the frame.

Advantageously, the resilient member comprises a polymeric material, preferably an elastomeric material, such as a rubber, and/or ethylene-propylene-diene, and/or butadiene, and/or acrylonitrile, and/or forms an elastomeric stud. Such materials are highly sensitive to temperatures, and the recess makes it possible to limit the deformation imposed during assembly, which limits the force variations due to temperature variations.

Advantageously, the hook is secured to one of the safety module and the frame, and the valve bridge is secured to the other of the safety module and the frame.

Advantageously, the hook is secured to the safety module and the valve bridge is secured to the frame.

Advantageously, the second surface has at least one portion adjacent to the inflection point that is tilted relative to a docking direction of the module on the frame. This makes it possible to limit the risks of displacement of the ring from its final position. In other words, the resilient ring is naturally pushed or guided toward its final position once it has passed the inflection point.

In other words, the resilient ring, in its final position, is not across from the portion of the second surface adjacent to the inflection point, but it is across from a portion of the second surface separate from the inflection point, and across from the third surface.

Advantageously, the adjacent portion of the second surface is tilted by an angle comprised in a range of values from 92° to 120°, in the trigonometric direction, which guarantees the nonreturn of the resilient ring, since it would be necessary to compress the resilient member again due to the incline.

Advantageously, the first surface of the hook comprises a secondary inflection point separating a first portion of the first surface, and a second portion of the first surface, the first portion of the first surface being arranged to tense the resilient ring during the docking movement from its initial position, and the second portion of the first surface being arranged to allow the resilient ring to relax toward the relaxed position (at the inflection point). The first portion of the first surface may for example be used to unhook the resilient ring from an initial position where it is stressed.

Advantageously, the third surface has a first portion forming the recess, and a second portion arranged across from the resilient ring in the final position, and the first portion of the third surface is offset from the second portion of the third surface by a distance comprised in a value range from 0.1 mm to 3 mm, along the docking direction.

Advantageously, the third surface comprises at least one tilted portion between the recess and a portion across from the resilient ring in the final position. This tilted portion allows the resilient ring to pass easily toward the final position.

Advantageously, said at least one tilted portion is tilted relative to the docking direction by an angle comprised in a value range from 110° to 150°, in the trigonometric direction.

Advantageously, a distance between at least one portion of the third surface and at least one portion of the second surface is constant. In other words, the second and third surfaces are parallel in part, which facilitates the journey of the resilient ring.

A second aspect of the invention relates to a vehicle steering wheel, comprising:
a frame with at least the valve bridge and the resilient ring of the fastening device according to the first aspect of the invention,
a safety module with the hook of the fastening device according to the first aspect of the invention.

A third aspect of the invention relates to a motor vehicle, comprising a steering wheel according to the second aspect of the invention.

BRIEF DESCRIPTION OF THE FIGURES

Other features and advantages of the present invention will appear more clearly upon reading the following detailed description of one embodiment of the invention, provided solely as a non-limiting example and illustrated by the appended drawings, in which.

DETAILED DESCRIPTION OF ONE EMBODIMENT OF THE INVENTION

Before describing one embodiment of the invention in detail, FIGS. 1 to 3 will be described, and show one embodiment of a device for fastening a safety module on a steering wheel according to the prior art.

Figure 1:
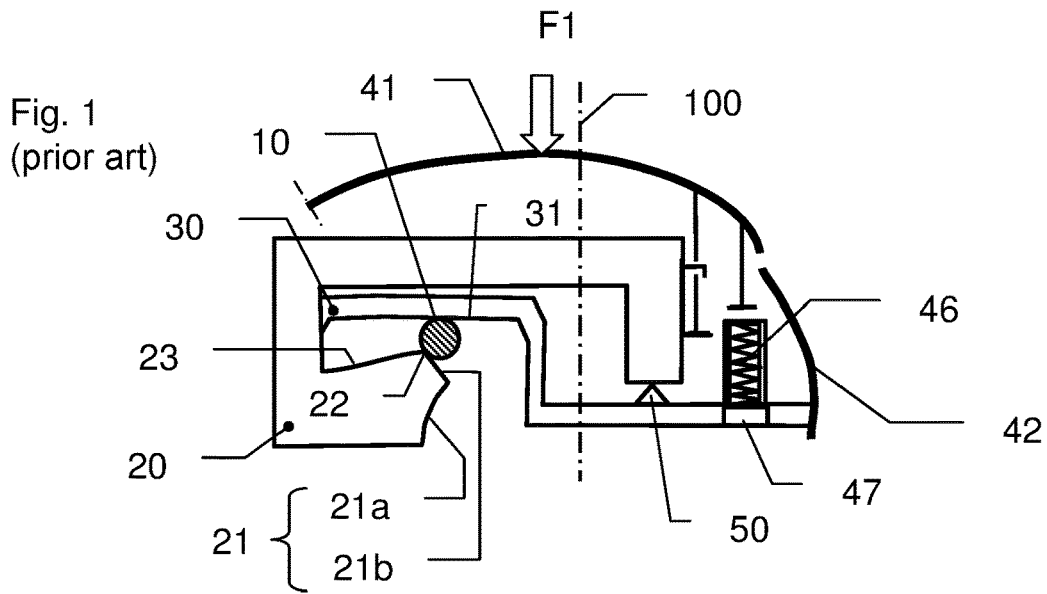
FIG. 1 shows a device for fastening a safety module on a steering wheel according to the prior art, at the beginning of an operation for locking the module on the steering wheel.
Figure 2:
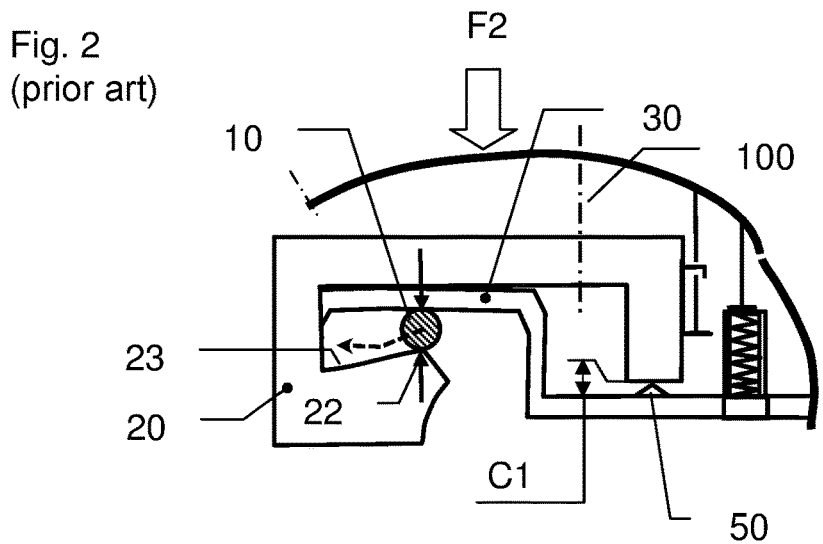
FIG. 2 shows the fastening device of FIG. 1, during locking.
Figure 3:
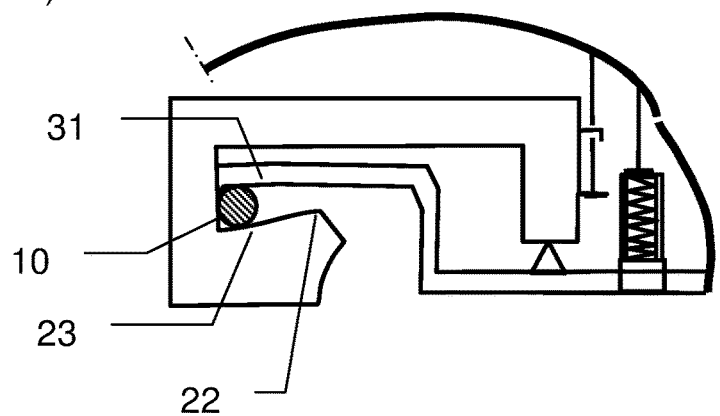
FIG. 3 shows the device of FIG. 1 at the end of locking.

FIGS. 1 to 3 show a hook 20 belonging to a vehicle steering wheel safety module (typically an airbag), and a cover 41 of which is visible, which forms an outer surface of the steering wheel. The rest of the safety module is not shown (the bag, the gas generator, the connecting parts, etc.), but the members of the safety module are secured to the hook 20. The vehicle steering wheel typically comprises a metal frame, a valve bridge 30 of which is visible, and the safety module is kept and locked on the steering wheel by a resilient ring 10 that is inserted between the frame (the valve bridge 30) and the module (the hook 20).

FIG. 1 shows the beginning of the locking of the safety module on the steering wheel (i.e., the end of the assembly or docking of the module on the steering wheel), where the resilient ring 10 is in contact with a second portion 21b of a first surface 21 of the hook 20, and a third surface 31 of the valve bridge 30.

The hook 20 comprises a first surface 21 with a first portion 21a and a second portion 21b, which are respectively used to radially compress the resilient ring 10 initially attached to the frame, then to guide it toward an inflection point 22 of the hook 20, during a movement of the safety module toward the bottom of FIG. 1, i.e., along an axis 100 that may be a rotation axis of the steering wheel, or a steering column axis (since it is pushed with a force F1 by an operator).

The steering wheel comprises a resilient member in the form of a resilient stud 50 arranged between the frame and the safety module, which exerts a continuous upward pushing force on the safety module, so as to avoid any clicking noise once the module is locked on the steering wheel, as will be explained in FIG. 3. Lastly, the steering wheel also comprises an audio warning contactor 47, at least one return spring 46 to push the cover 41 back toward an idle position (in which the audio warning contactor is not activated), and a static cover plate 42, secured to the frame.

FIG. 2 shows the resilient ring 10 at the inflection point 22 of the hook 20, since the operator henceforth exerts a downward force F2, greater than the force F1, to still further compress the resilient stud 50, as shown by the residual play C1, which allows the resilient stud 10, still in contact with the third surface 31 of the valve bridge 30, to relax radially relative to the axis 100, and to go toward a second surface 23 of the hook 20.

Once relaxed, the resilient ring 10 occupies a final position, as shown in FIG. 3, where the resilient ring 10 bears on the second surface 23 and the third surface 31, and then locks the safety module on the frame and on the steering wheel. As shown in FIG. 3, the resilient stud 50 still exerts an upward pushing force on the safety module, which reacts the play and avoids any sloshing of the safety module, as well as any clicking noises.

The device for fastening the safety module on the steering wheel therefore comprises the hook 20, the valve bridge 30 and the resilient ring 10, and the assembly requires greatly compressing the resilient stud 50. Due to dimensional or temperature variations, the compression force F2 to be exerted by the operator can vary greatly.

Figure 4:
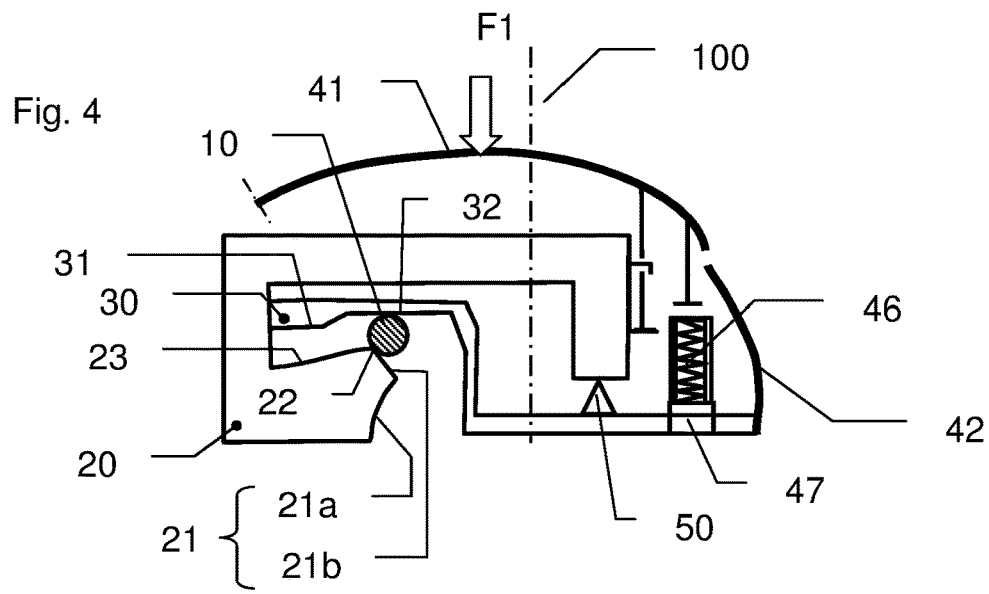
FIG. 4 shows a device for fastening a safety module on a steering wheel according to the invention, at the beginning of an operation for locking the module on the steering wheel.

FIG. 4 shows a fastening device according to the invention, which makes it possible to facilitate the assembly/locking. This fastening device, shown in FIGS. 4 to 6, differs from that of the prior art (FIGS. 1 to 3) in the valve bridge 30, the rest of the members being similar.

Figure 5:
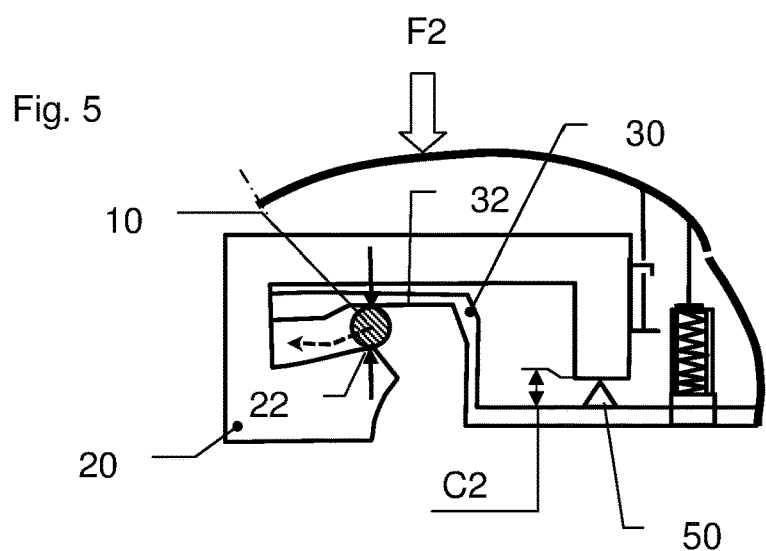
FIG. 5 shows the fastening device of FIG. 4, during locking.
Figure 6:
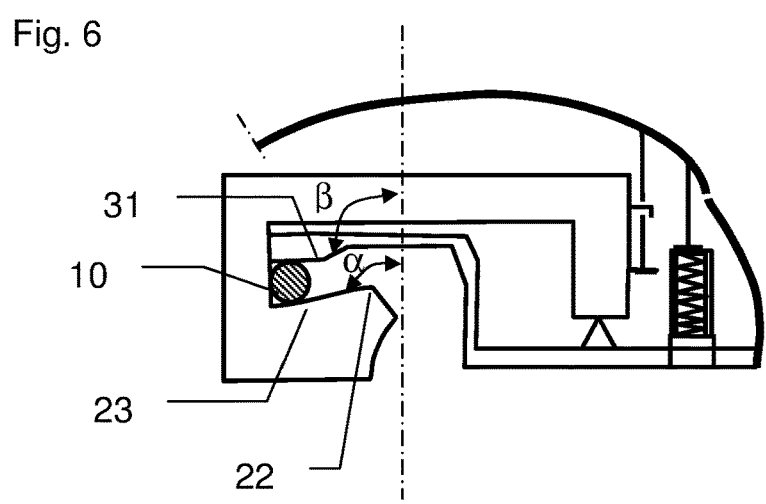
FIG. 6 shows the device of FIG. 4 at the end of locking.

As shown in FIGS. 4 to 6, the valve bridge 30 still has a third surface 31, but the latter comprises a recess 32, arranged across from the inflection point 22 of the hook 20. Such a recess 32 can be an indentation, an incline, a curve, but it results in a level difference of the valve bridge 30 between its portion at the inflection point 22 and its portion at the final position of the resilient ring 10. In particular, this level difference can range from 0.1 to 3 mm, and preferably from 0.1 mm to 0.5 mm.

As shown in FIG. 5, when the resilient ring 10 passes between the inflection point 22 and the recess 32, the safety module does not need to descend as much as for the fastening device of the prior art, such that the resilient stud 50 is compressed less, as shown by the distance C2 of FIG. 5, which is greater than the distance C1 of FIG. 2. As a result, the force F2 to be exerted by the operator in FIG. 5 is lower than the force F2 of FIG. 2 for an identical final relative position of the safety module with respect to the frame.

Next, the resilient ring 10 can relax to go to the final position, as shown by FIG. 6, since an incline is arranged on the valve bridge 30 to go from the recess to the third surface 31, such that the safety module is locked on the steering wheel, in the same way as for the device of the prior art shown in FIG. 3.

As shown in FIG. 6, the second surface 23 has, near the inflection point 22, an angle α (visible in FIG. 6) comprised between 91° and 120°, and more preferably 92° to 105°, relative to the docking or assembly direction of the safety module (the axis 100), in order to prevent any return of the resilient ring 10 once the latter is in the final position. Furthermore, the recess 32 is separated from the third surface 31 of the valve bridge 30 by an inclined portion, tilted by an angle β (visible in FIG. 6) comprised between 110° and 150° for example, to allow the resilient ring 10 to go from the inflection point 22 to its final position easily.

It will be understood that various changes and/or improvements can be made to the various embodiments of the invention described in the present description without going beyond the scope of the invention defined by the appended claims. In particular, reference is made to a hook 20 secured to the safety module and to the valve bridge 30 integrated into the frame of the steering wheel, but it may also be considered to arrange the hook secured to the frame of the steering wheel, and to form the valve bridge on the safety module.

The invention claimed is:

1. A device for fastening a safety module on a steering wheel frame, the device comprising:
   a resilient member arranged between the steering wheel frame and the safety module for exerting a continuous pushing force opposite to a pushing direction;
   at least one resilient ring movable between an initial position and a final position,
   at least one hook having:
      a first surface forming a guide track ending on an inflection point, to cause the resilient ring to go, during a docking movement of the module on the steering wheel frame, from the initial position to a relaxed position at the inflection point, and
      a second surface separated from the first surface by the inflection point and arranged to receive the resilient ring going from the relaxed position to the final position;
   at least one valve bridge with a third surface across from the second surface,
   wherein the resilient ring in the final position locks the module fixed on the frame by bearing on the second surface and on the third surface, and
   wherein the third surface and the second surface cooperate to define an opening for receiving the resilient ring, the opening having an open end and a closed end, the open end proximate the inflection point, the resilient ring being proximate the closed end in the final position, the third surface comprises at least one recess arranged across from the inflection point such that the at least one recess provides a level difference of the valve bridge in the pushing direction at the inflection point and at the closed end.

2. The fastening device according to claim 1, wherein the resilient member is arranged between the frame and the safety module, to exert a residual force in a direction opposite a docking direction of the module on the frame once the module is fastened on the frame.

3. The fastening device according to claim 1, wherein the hook is secured to the safety module and the valve bridge is secured to the frame.

4. The fastening device according to claim 1, wherein the second surface has at least one portion adjacent to the inflection point that is tilted relative to a docking direction of the module on the frame.

5. The fastening device according to claim 1, wherein an adjacent portion of the second surface is tilted by an angle comprised in a range of values from 92° to 120°, in a trigonometric direction.

6. The fastening device according to claim 1, wherein the first surface of the hook comprises a secondary inflection point separating a first portion of the first surface, and a second portion of the first surface, the first portion of the first surface being arranged to tense the resilient ring during the docking movement from the initial position, and the second portion of the first surface being arranged to allow the resilient ring to relax toward the relaxed position.

7. The fastening device according to claim 1, wherein the third surface has a first portion forming the recess, and a second portion arranged across from the resilient ring in the final position, wherein the first portion of the third surface is offset from the second portion of the third surface by a distance comprised in a value range from 0.1 mm to 3 mm, along the docking direction.

8. The fastening device according to claim 1, wherein the third surface comprises at least one tilted portion between the recess and a portion across from the resilient ring in the final position.

9. The fastening device according to claim 1, wherein the at least one tilted portion is tilted relative to the docking direction by an angle comprised in a value range from 110° to 150°, in a trigonometric direction.

10. The fastening device according to claim 1, wherein the second surface is tilted relative to a displacement direction of the module during assembly.

11. The fastening device according to claim 1, wherein a distance between at least one portion of the third surface and at least one portion of the second surface are parallel.

12. The fastening device according to claim 1 in combination with a vehicle steering wheel, comprising:
   the steering wheel frame with at least the valve bridge of the fastening device; and
   the safety module with the hook of the fastening device.

13. The fastening device of claim 1 in combination with a motor vehicle, having a steering wheel.

* * * * *